United States Patent
Ohkado et al.

(10) Patent No.: US 9,075,410 B2
(45) Date of Patent: Jul. 7, 2015

(54) ABNORMALITY DETECTION FOR ISOLATING A CONTROL SYSTEM

(75) Inventors: Akira Ohkado, Yamato (JP); Yukihiko Sohda, Yamato (JP); Masami Tada, Yamato (JP); Tadashi Tsumura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 13/365,533

(22) Filed: Feb. 3, 2012

(65) Prior Publication Data
US 2012/0209411 A1  Aug. 16, 2012

(30) Foreign Application Priority Data
Feb. 15, 2011  (JP) .................................. 2011-029418

(51) Int. Cl.
G05B 9/02 (2006.01)
G06F 11/00 (2006.01)
G05B 19/048 (2006.01)
H04L 29/06 (2006.01)
G06F 21/55 (2013.01)

(52) U.S. Cl.
CPC .......... G05B 19/048 (2013.01); H04L 63/1425 (2013.01); G06F 21/552 (2013.01)

(58) Field of Classification Search
CPC ................................................... G05B 19/048
USPC ....................................................... 700/79, 80
See application file for complete search history.

(56) References Cited

U.S. PATENT DOCUMENTS

| 4,325,251 A | * | 4/1982 | Kanegae .................... 73/114.61 |
| 7,539,845 B1 | * | 5/2009 | Wentzlaff et al. ............... 712/10 |
| 7,636,915 B1 | | 12/2009 | DiVittorio |

(Continued)

FOREIGN PATENT DOCUMENTS

| EP | 1420317 A2 | 5/2004 |
| JP | 06348239 A | 12/1994 |

(Continued)

OTHER PUBLICATIONS

U.S. Appl. No. 13/765,142, filed Apr. 2, 2013, 1 page.

(Continued)

*Primary Examiner* — Mohammad Ali
*Assistant Examiner* — Yuhui R Pan
(74) *Attorney, Agent, or Firm* — Francis Lammes; Stephen J. Walder, Jr.; Jeffrey S. LaBaw

(57) ABSTRACT

A mechanism is provided for effectively detecting an abnormality occurring in a control system and isolating the control system in which abnormality is acknowledged. The mechanism receives, from one or more control systems in the plurality of control systems, respective abnormality notifications for respective counter control systems to be monitored by the plurality of control systems. The mechanism adds up abnormality notifications transmitted from respective monitoring sections of the plurality of control systems so as to evaluate the reputation of a control system suspected to have an abnormality. The mechanism causes a protected area for operating the control system suspected to have an abnormality to restrict outbound traffic from at least the inside of the protected area, when an indication is identified that the control system is abnormal according to criteria from a result of the evaluation.

17 Claims, 10 Drawing Sheets

(56) References Cited

U.S. PATENT DOCUMENTS

| | | | |
|---|---|---|---|
| 2003/0191966 A1* | 10/2003 | Gleichauf | 713/201 |
| 2006/0021029 A1* | 1/2006 | Brickell et al. | 726/22 |
| 2006/0114832 A1 | 6/2006 | Hamilton et al. | |
| 2006/0236374 A1* | 10/2006 | Hartman | 726/3 |
| 2008/0082284 A1 | 4/2008 | Carroll et al. | |
| 2008/0134178 A1 | 6/2008 | Fitzgerald et al. | |
| 2009/0002150 A1* | 1/2009 | Zilberstein et al. | 340/531 |
| 2009/0083843 A1 | 3/2009 | Wilkinson, Jr. et al. | |
| 2010/0076575 A1 | 3/2010 | Vasko et al. | |
| 2011/0145926 A1* | 6/2011 | Dalcher et al. | 726/26 |
| 2011/0184575 A1* | 7/2011 | Kawamoto et al. | 700/292 |
| 2011/0290893 A1 | 12/2011 | Steinberg | |
| 2012/0203508 A1 | 8/2012 | Hamzaoui et al. | |
| 2012/0210158 A1 | 8/2012 | Akiyama et al. | |

FOREIGN PATENT DOCUMENTS

| | | | |
|---|---|---|---|
| JP | 08077119 A | 3/1996 |
| JP | 9069083 A | 3/1997 |
| JP | 09-237240 | 9/1997 |
| JP | 10501354 A | 2/1998 |
| JP | 2000047987 A | 2/2000 |
| JP | 2000508104 A | 6/2000 |
| JP | 2001-243587 A | 9/2001 |
| JP | 2002007234 A | 1/2002 |
| JP | 2002-509669 | 3/2002 |
| JP | 2002-510415 | 4/2002 |
| JP | 2002111727 A | 4/2002 |
| JP | 2002-149614 A | 5/2002 |
| JP | 2003036243 A | 2/2003 |
| JP | 2003114294 A | 4/2003 |
| JP | 2004-118866 A | 4/2004 |
| JP | 2004518193 A | 6/2004 |
| JP | 2004234401 A | 8/2004 |
| JP | 2004-302538 A | 10/2004 |
| JP | 2005063054 A | 3/2005 |
| JP | 3701688 B2 | 5/2005 |
| JP | 2005-250802 A | 9/2005 |
| JP | 2005-277655 A | 10/2005 |
| JP | 2006-033140 A | 2/2006 |
| JP | 2006-049909 A | 2/2006 |
| JP | 2006178936 A | 7/2006 |
| JP | 2006252256 A | 9/2006 |
| JP | 2007-096735 A | 4/2007 |
| JP | 2007-526452 A | 9/2007 |
| JP | 2007-274027 A | 10/2007 |
| JP | 2008-015722 A | 1/2008 |
| JP | 2008500653 A | 1/2008 |
| JP | 2008097164 A | 4/2008 |
| JP | 2008527471 A | 7/2008 |
| JP | 2008537267 A | 9/2008 |
| JP | 2008-243195 A | 10/2008 |
| JP | 2009-015861 | 1/2009 |
| JP | 2009009557 A | 1/2009 |
| JP | 2009-037545 A | 2/2009 |
| JP | 2009-529187 A | 8/2009 |
| JP | 2009-245029 A | 10/2009 |
| JP | 4521456 B2 | 8/2010 |
| JP | 4567106 B2 | 10/2010 |
| JP | 2010267119 A | 11/2010 |

OTHER PUBLICATIONS

U.S. Appl. No. 13/766,338, filed Apr. 2, 2013, 1 page.
U.S. Appl. No. 13/803,388, filed Apr. 2, 2013, 1 page.
U.S. Appl. No. 13/365,594, filed Mar. 9, 2012, 1 page.
U.S. Appl. No. 13/365,626, filed Mar. 9, 2012, 1 page.
Dzung, Dacfey et al., "Security for Industrial Communication Systems", Proceedings of the IEEE, vol. 93, No. 6, Jun. 2005, pp. 1152-1177.
Falco, Joe et al., "IT Security for Industrial Control Systems", http://citeseerx.ist.psu.edu/viewdoc/download?doi=10.1.1.13.9422&rep=rep1&type=pdf, date unknown, 16 pages.
Stouffer, Keith et al., "Guide to Industrial Control Systems (ICS) Security", National Institute of Standards and Technology Special Publication 800-82 (Final Public Draft) Natl. Inst. Stand. Technol. Spec. Publ. 800-82, (Sep. 2008), 156 pages.
Notice of Allowance mailed Jan. 2, 2014 for U.S. Appl. No. 13/365,594; 13 pages.

* cited by examiner

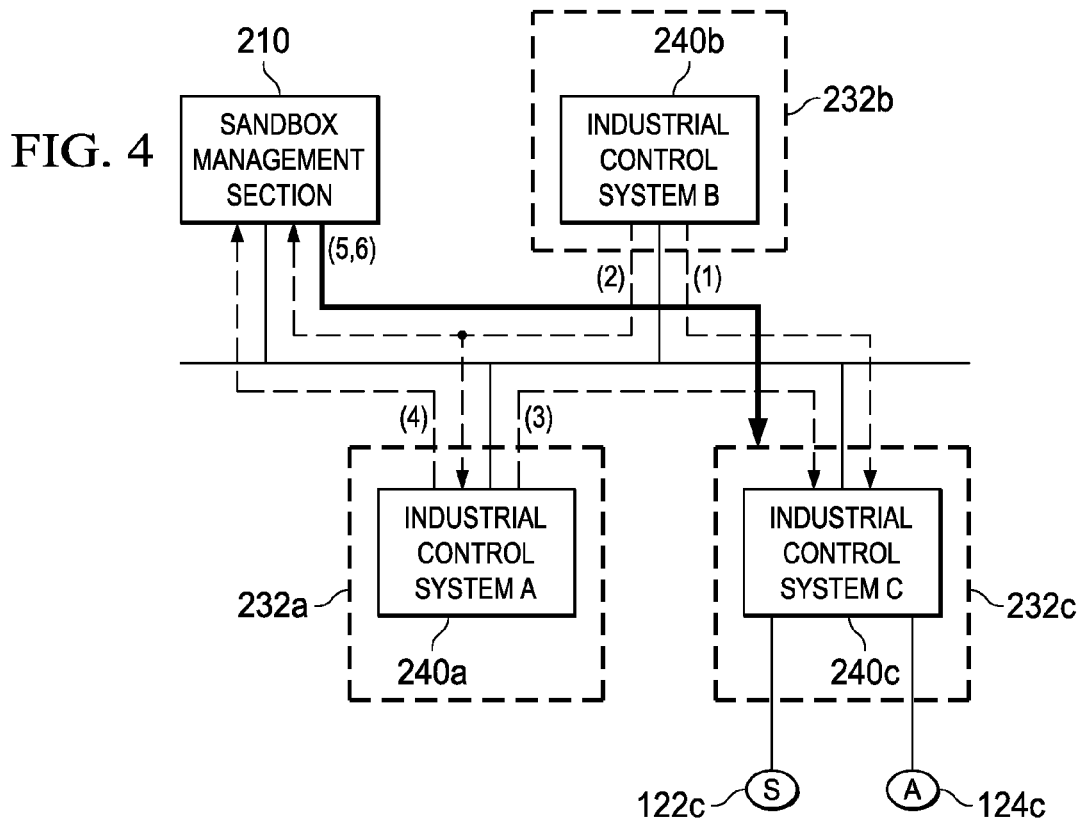

FIG. 7B

| B | | | | | | | |
|---|---|---|---|---|---|---|---|
| PERIPHERAL SYSTEMS FOR A | | PERIPHERAL SYSTEMS FOR F | | PERIPHERAL SYSTEMS FOR G | | PERIPHERAL SYSTEMS FOR H | |
| OWN JUDGMENT | ABNORMAL | OWN JUDGMENT | — | OWN JUDGMENT | — | OWN JUDGMENT | — |
| C | — | E | — | — | — | — | — |
| D | NOTIFICATION RECEIVED | — | — | — | ... | C | ... |
| E | NOTIFICATION RECEIVED | J | — | ... | ... | ... | ... |

ABNORMALITY DETECTION FOR ISOLATING A CONTROL SYSTEM

BACKGROUND

The present invention relates to information security technology, more specifically, to an abnormality detection mechanism for effectively detecting abnormality which occurs in a control system and for isolating the control system in which abnormality is observed.

The modern society works out on various kinds of infrastructures including electrical services, gas services, water services, train services, financing, plants, pipe lines and the like. In recent years, in order to realize a stylish office, a stylish building, a stylish city, and stylish energy use, interconnection between industrial control systems via a network and collaboration with information systems are developed in the above important infrastructures in the society.

On the other hand, industrial control systems have been designed assuming the operation in a closed system isolated from the outside conventionally, because the stop of the function thereof might have a large influence on the social economy. Therefore, security measures in the industrial control systems are not necessarily perfect in comparison with those in the information systems, and there has been a problem that the industrial control systems are easy to be affected by threats such as a virus, a worm, Trojan horse, other malicious codes, hacking, an unauthorized break-in, attacks by an insider, abnormal operation, and divulging of information in an open environment connected to a network such as the Internet.

However, if by any chance the important infrastructures are attacked, the influence thereof becomes large and extensive. Since an industrial control systems controls actuators such as valves of a plant and a pipe line, the malfunction thereof causes not only interruption of their operations, but also the excessive pressure of a boiler, human sufferings such as city-scale blackouts due to inappropriate transmission of electric energy, and environmental destruction due to unusual discharge of a dam. Accordingly, it is desirable to realize advanced security so as to protect the industrial control system from such threats mentioned above. Further, if by any chance abnormality in which the aforementioned threats are suspected occurs, it is desirable to protect an industrial device and other industrial control systems by detecting the abnormality quickly.

Incidentally, as for the virus, the unauthorized access, and the like, various types of security measures are known in the information systems. In view of this, it is considered useful to some extent to introduce a security measure applied in the information systems. As a security technique in the information systems, for example, Japanese Unexamined Patent Publication No. 2004-302538 describes a technique called A-IDS (Autonomous Intrusion Detection System) having a feature of taking a mutual monitoring configuration in which all terminals in a network (DMZ) to be protected are monitored by another terminal.

Japanese Unexamined Patent Publication No. 2006-33140 discloses a network management apparatus having such a feature that: when a source which generates an unauthorized access is detected, the number of unauthorized-packet sending terminals is counted every segment for the purpose of quickly restraining diffusion of such a source, and an interface to which a segment is connected is searched; and when the number of unauthorized-packet sending terminals is not within a range of a predetermined number, which is set beforehand, in a segment where the unauthorized-packet sending terminals belong to, the interface to which the segment where the unauthorized-packet sending terminals belong to is connected is blocked. Japanese Unexamined Patent Publication No. 2005-250802 discloses an unauthorized-access detection apparatus having such a feature that: received access data is analyzed; feature quantity data indicative of features of abnormal data is calculated; feature quantity data is inserted into feature-quantity storage data; a statistical model for separating a value area considered to be a normal access and a value area considered to be an abnormal access is formed from the feature-quantity storage data; and it is judged whether feature quantity data belongs to the value area considered to be an abnormal access in the statistical model. Japanese Unexamined Patent Publication No. 2007-96735 discloses a learning-type network security apparatus for protecting an information processing apparatus from an unauthorized break-in, which apparatus is provided between an external network and LAN, and the information processing apparatus.

Further, a security model, called a sandbox, for preventing that a system is operated in an unauthorized manner, by operating a program in a protected area. For example, Japanese Translation of PCT International Application Publication No. 2004-518193 discloses a computer system including a desktop isolation area or a sandbox for suspicious data. Japanese Translation of PCT International Application Publication No. 2008-500653 discloses a method to achieve security improvement of a processing system by performing at least one of execution and access of a suspicious file in a sandbox virtual machine.

However, the industrial control systems have a feature different from that of the information systems, and it cannot be said that the application of security techniques performed in the information systems is not sufficient. Thus, the abnormality in which the aforementioned threats are suspected cannot be detected effectively to take measures for it. Further, the industrial control systems require real-time characteristics of a device control, and therefore heavy-load monitoring and diagnosis are not appropriate.

Patent Documents

Japanese Unexamined Patent Publication No. 2004-302538
Japanese Unexamined Patent Publication No. 2006-33140
Japanese Unexamined Patent Publication No. 2005-250802
Japanese Unexamined Patent Publication No. 2007-96735
Japanese Translation of PCT International Application Publication No. 2004-518193
Japanese Translation of PCT International Application Publication No. 2008-500653
Japanese Unexamined Patent Publication No. 2007-34672

SUMMARY

The present invention is accomplish in view of the problems in the conventional control systems, and it is an object of the present invention to provide an abnormality detection system, an abnormality detection apparatus, an abnormality detection method, a program, and a storage medium each of which can isolate a control system in which abnormality is confirmed by moderately monitoring intercommunication between control systems and effectively detecting a control system suspected to have an abnormality within the system.

In order to solve the conventional problems, the present invention provides an abnormality detection system and an abnormality detection apparatus included in the abnormality detection system, each having the following features. An abnormality detection system of the present invention includes a plurality of control systems each connected to a network and operating in a corresponding protected area. In the present abnormality detection system, each control system is provided with a monitoring section for inspecting data exchanged between the control system and its counter control system to be monitored and for transmitting an abnormality notification when the counter control system is suspected to have an abnormality. An abnormality detection apparatus included in the abnormality detection system includes a management section for managing protected areas. The management section adds up abnormality notifications transmitted from respective monitoring sections of the plurality of control systems so as to evaluate the reputation of a control system suspected to have an abnormality, and controls a protected area for operating the control system suspected to have an abnormality to restrict outbound traffic from at least the inside of the protected area, when it is judged that the control system is abnormal according to criteria from a result of the evaluation.

Further, in the present invention, the management section can further cause the protected area for operating the control system suspected to have an abnormality to separate the control system from a usual network and to connect the control system to an inspection network to which a diagnostic module is connected. Further, in the present invention, when no abnormality is confirmed as a result of diagnosis by the diagnostic module, the management section can cause the protected area for operating the control system suspected to have an abnormality to release the restriction on the outbound traffic, and cause the protected area to separate the control system from the inspection network so as to restore the connection to the network.

According to the above configuration, it is possible to effectively detect a control system suspected to have an abnormality within the system by moderately monitoring intercommunication between control systems, thereby eventually resulting in that a monitor load for abnormality detection between the control systems can be reduced.

BRIEF DESCRIPTION OF THE SEVERAL VIEWS OF THE DRAWINGS

Embodiments of the present invention will now be described by way of example with reference to the accompanying drawings in which like references denote similar elements, and in which:

FIG. 4 is a view which describes a flow of an abnormality detection process in the abnormality detection mechanism according to the embodiment of the present invention;

FIGS. 7A and 7B are views which exemplifies a data structure of topology data held in the industrial system according to an embodiment of the present invention;

DETAILED DESCRIPTION

Hereinafter, the present invention is described based on embodiments, but the present invention is not limited to the embodiments to be described below. In the embodiments described below, an industrial system and a management server are used respectively as an example of an abnormality detection system and as an example of an abnormality detection apparatus to describe the present invention.

Figure 1:
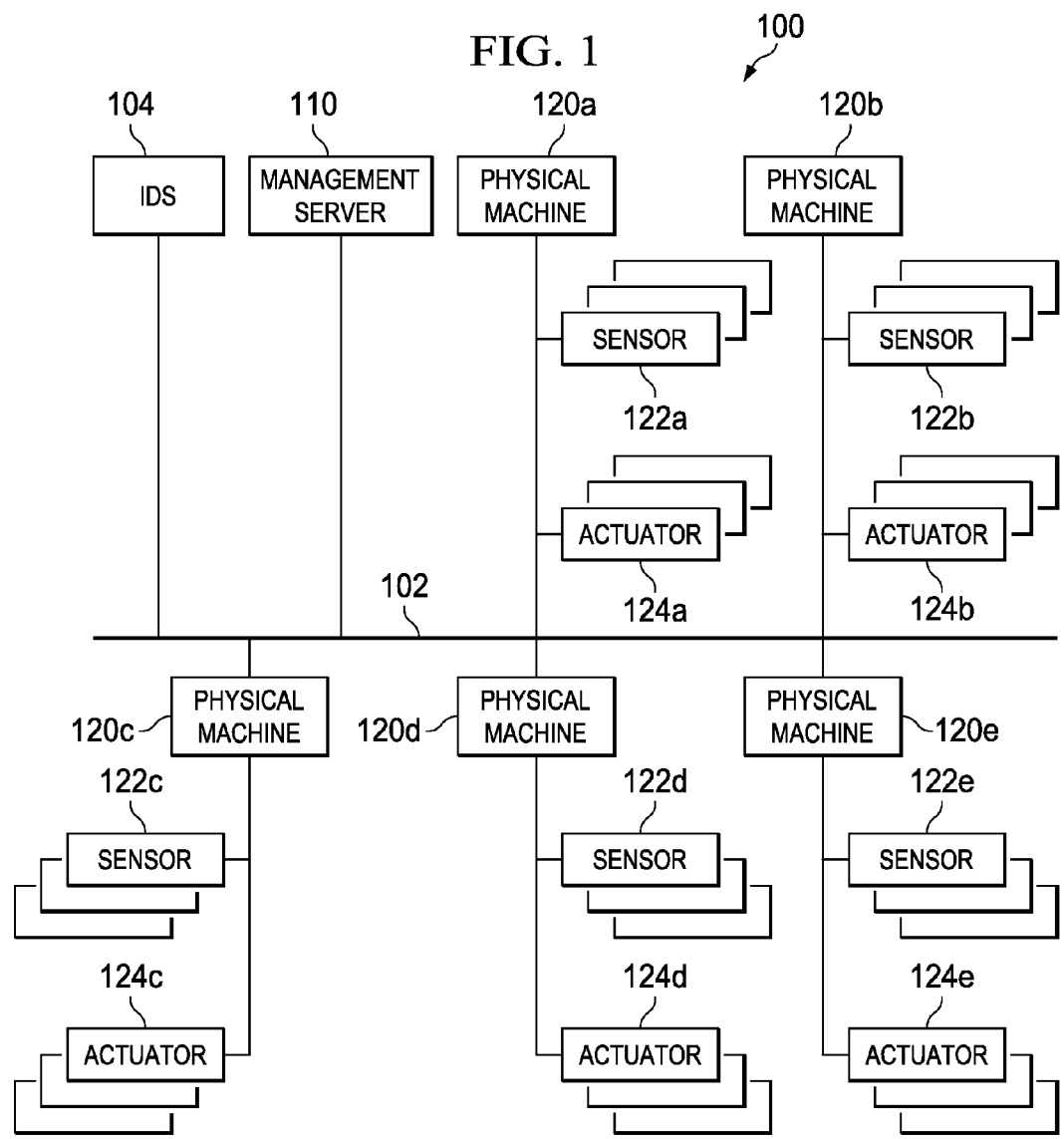
FIG. 1 is a view illustrating a schematic configuration of an industrial system according to an embodiment of the present invention.

FIG. 1 is a view illustrating a schematic configuration of an industrial system according to an embodiment of the present invention. An industrial system 100 illustrated in FIG. 1 includes a management server 110 and one or more physical machines 120a to 120e, which are connected to a network 102. The industrial system 100 is not limited in particular, but is configured as a system in agriculture, financing, chemistry, commercial facilities, a dam, a defense industrial infrastructure, an urgent service, an energy service, government facilities, information technology, a nuclear reactor, logistics, public health, communication, transportation, a water service, a vital manufacturing industry, and the like.

The physical machine 120 operates one or more industrial control systems thereon. An industrial control system implemented on the physical machine 120 has a function suitable for specific use, and in general, it is a supervisory control server which communicates with a field device and performs system monitoring and process control. The industrial control system is not limited in particular, but examples thereof include a supervisory control server in SCADA (Supervisory Control And Data Acquisition) which remotely and intensively monitors control targets which are geographically distributed and collects control data, a distributed control system (DCS: Distributed Control System), and the like.

The physical machine 120 is connected to an industrial device, e.g., a field device, through a control network, a field network, and a sensor bus. Examples of the field device can include a sensor 122, an actuator 124, and other various types of industrial equipment. The sensor 122 is not limited in particular according to its specific use, but examples thereof may be various types of measuring instruments such as a temperature sensor, a humidity sensor, a pressure sensor, an air conditioning sensor, a flow meter, a water level indicator, an illumination meter, a power meter, an electricity consumption counter, a motion sensor, and the like. The actuator 124 is not limited in particular according to its specific use, but examples thereof may be a valve switch, a heat regulator, a compressor, a pump, other motors, and an apparatus actively functioning.

The network 102 is not limited in particular, but may be, for example, one including LAN (Local Area Network) by TCP/IP and Ethernet (registered trademark). Further, the network 102 may be configured as a wide-area network which is constituted by combining LANs at different locations via a private line or a public line using VPN (Virtual Private Network). Furthermore, on the network 102, an exclusive network-type IDS (Intrusion Detection System) 104 and the like can be provided as appropriate. When the IDS 104 is provided, the accuracy of the abnormal detection can be further improved.

Industrial control systems according to the embodiment of the present invention operate on respective physical machines 120 in respective sandboxes. A sandbox refers to a protected area for operating a program, which area is isolated from other processes and is restricted from operating its outside from its inside. In the sandbox according to the embodiment of the present invention, an industrial control system which operates inside the sandbox can access an external sensor 122, actuator 124, and the like without any particular restriction in a normal state. However, once the sandbox is activated, the access of the industrial control system is restricted, and the industrial control system is isolated from the outside. The management server 110 has a function to manage sandboxes of the physical machines 120. When the management server 110 finds an industrial control system in which an abnormality is observed, the management server 110 activates a sandbox in which the industrial control system operates, so as to once separate, from the whole system, the industrial control system in which an abnormality is observed.

Figure 2:
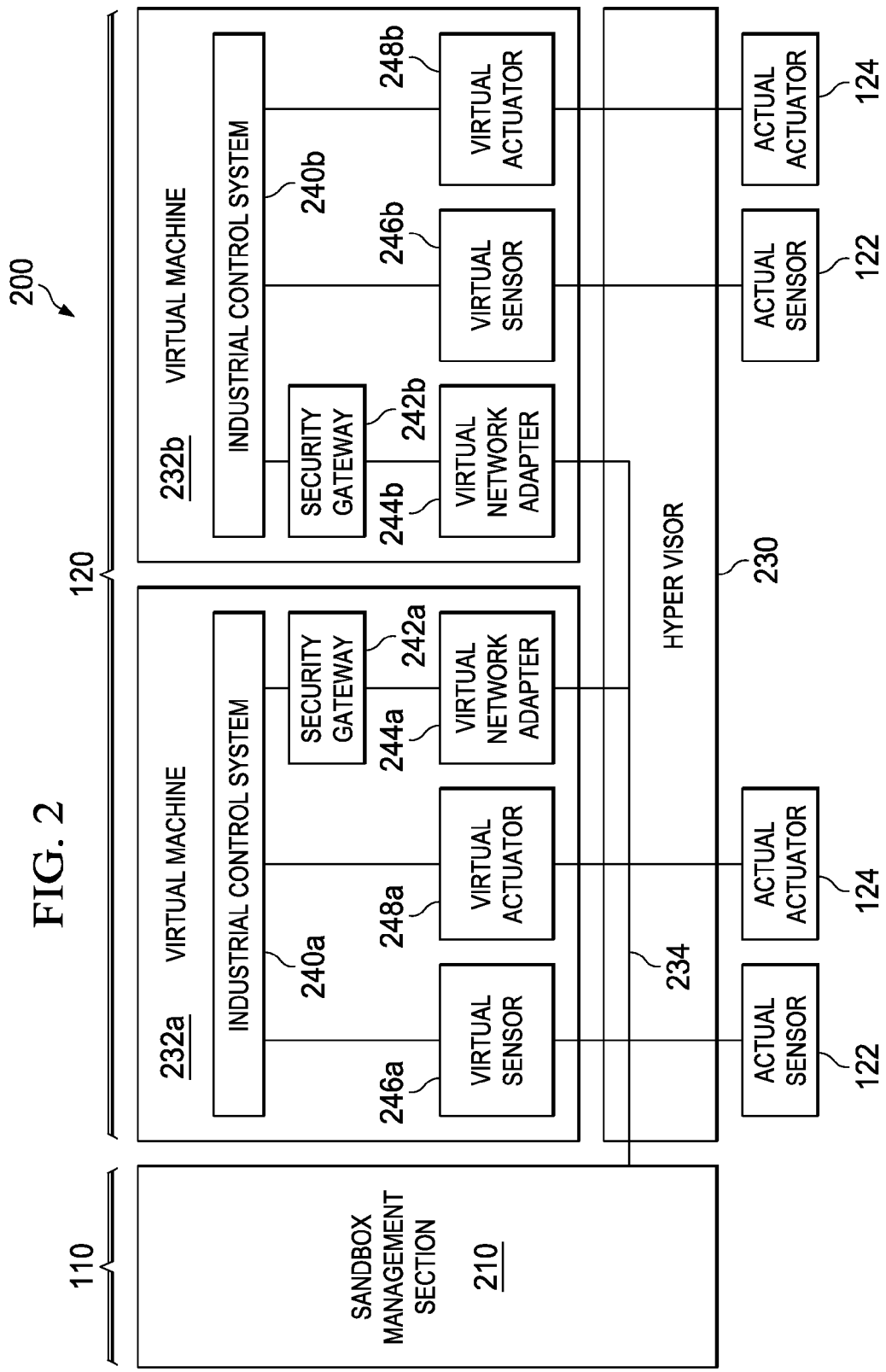
FIG. 2 is a view illustrating software and hardware configurations in the industrial system according to the embodiment of the present invention.

In the embodiment of the present invention, a system virtualization technique can be applied to realize the sandbox and its management mechanism. FIG. 2 is a view illustrating software and hardware configurations of the industrial control system according to the embodiment of the present invention. A physical machine 120 is generally configured as a general-purpose computer apparatus such as a personal computer, a workstation, a rack-mount server, a blade-type server, and a mainframe. More specifically, the physical machine 120 includes hardware resources such as a CPU (for example, a single-core processor or a multi-core processor), a cache memory, an RAM, a network adapter, a storage device, and the like.

The physical machine 120 includes a hypervisor (referred to as a virtual machine monitor in some cases) 230 such as bare-metal or host virtualization software of Xen (registered trademark), VMWare (registered trademark), Hyper-V (registered trademark), or Virtual PC. The physical machine 120 accordingly operates, on this hypervisor 230, various types of general-purpose OS such as Windows (registered trademark), UNIX (registered trademark), and LINUX (registered trademark), and one or more virtual machines 232a and 232b (two virtual machines are exemplified in FIG. 2) which assumes an industrial-use OS as a guest OS.

A virtual machine 232 provides a protected area according to the embodiment of the present invention, namely, a sandbox, and operates an industrial control system 240 thereon. On the virtual machine 232, pieces of physical hardware, such as an actual network adapter (not shown in the figure; in the present specification, physical hardware is referred to with the word "actual" attached thereto so as to distinguish it from virtual hardware which is virtualized and assigned to a virtual machine), an actual sensor 122, and an actual actuator 124, which are connected to the physical machine 120, are respectively virtualized as a virtual network adapter (note that hardware which is virtualized and assigned to each virtual machine is referred to with the word "virtual" so as to distinguish it from physical hardware) 244, a virtual sensor 246, and a virtual actuator 248, and assigned to the virtual machine 232.

The management server 110 includes a sandbox management section 210 which provides a function to manage a sandbox on the physical machine 120. The management server 110 is generally configured as a general-purpose computer apparatus and includes hardware resources such as a CPU, a cache memory, an RAM, a network adapter, and a storage device. The management server 110 implements the sandbox management section 210 under the control of an appropriate OS such as Windows (registered trademark), UNIX (registered trademark), or LINUX (registered trademark). Note that in the embodiment described herein, the management server 110 is described as a server implemented as a physical system that is separate from the physical machine 120. However, in other embodiments, the management server 110 may serve as a virtual machine operating on the physical machine 120 and have the sandbox management function.

The sandbox management section 210 issues a command to the hypervisor 230 on the physical machine 120, controls attaching and detaching of the virtual sensor 246 and the virtual actuator 248 assigned to the virtual machine 232, and controls a logical connection between the virtual sensor 246 and the actual sensor 122 and a logical connection between the virtual actuator 248 and the actual actuator 124. When the sandbox management section 210 activates a sandbox, the sandbox management section 210 issues a command to the hypervisor 230 on the physical machine 120 in which a corresponding virtual machine 232 operates, so as to block the logical connection between the virtual sensor 246 of the virtual machine 232 and the actual sensor 122 and the logical connection between the virtual actuator 248 of the virtual machine 232 and the actual actuator 124. On the other hand, when the sandbox management section 210 inactivates the sandbox, the sandbox management section 210 issues a command to the hypervisor 230 so as to restore the logical connection between the virtual sensor 246 and the actual sensor 122 and the logical connection between the virtual actuator 248 and the actual actuator 124.

The virtual machine 232 is connected, via the virtual network adapter 244, to a virtual network 234, which is a logical network in which a plurality of virtual machines 232 and the sandbox management section 210 participate, so that the industrial control systems 240 on the virtual machines 232 can mutually communicate with each other via this virtual network 234. In the present embodiment, in order to realize moderate mutual monitoring between the industrial control systems 240, a security gateway 242 is provided between each of the industrial control systems 240 and its corresponding virtual network adapter 244 so as to monitor traffic between the industrial control systems 240.

The security gateway 242 examines traffic data exchanged between an industrial control system (e.g., 240a) provided with the security gateway 242 and a counter industrial control system (e.g., 240b), so as to check whether the counter industrial control system (e.g., 240b) works normally. When the counter industrial control system (240b) is suspected to have an abnormality, the security gateway (e.g., 242a) notifies the sandbox management section 210 and other industrial control systems (not shown) of that fact. Upon receiving the notification that an abnormality is suspected, the other industrial control systems can appropriately perform the inspection that is similar to the above by themselves with respect to the industrial control system (e.g., 240b) which is suspected to have an abnormality.

The sandbox management section 210 grasps topologies of mutual monitoring between the industrial control systems 240, and adds up abnormality notifications reported from the security gateways 242 so as to evaluate the reputation (standing, reliability, rumor) of the industrial control system suspected to have an abnormality, which reputation is made by neighboring industrial control systems. From a result of the evaluation, when it is judged that the control system is abnormal according to given criteria, the sandbox management section 210 activates a sandbox for operating the control system suspected to have an abnormality, in the aforementioned manner. The embodiment of the present invention adopts an abnormality detection mechanism for detecting an abnormality based on the reputation made by such neighboring industrial control systems.

Figure 3:
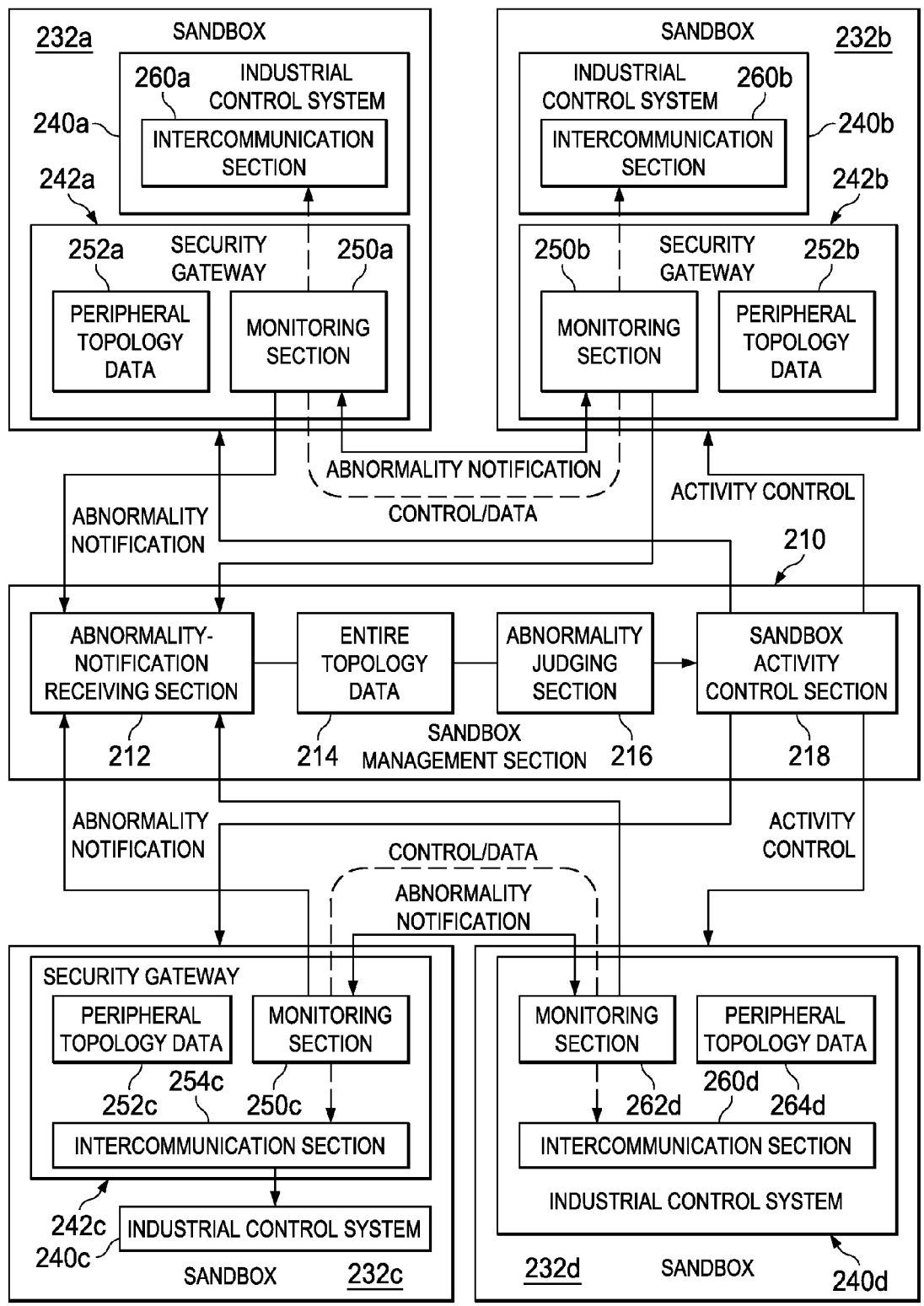
FIG. 3 is a functional block chart related to an abnormality detection mechanism according to the embodiment of the present invention.

Hereinafter, with reference to FIG. 3 to FIG. 7, the abnormality detection mechanism realized in the industrial control system according to the embodiment of the present invention is described in detail. FIG. 3 is a functional block chart related to the abnormality detection mechanism according to the embodiment of the present invention. FIG. 3 illustrates detailed functional blocks 200 of the sandbox management section 210 and the sandbox (virtual machine) 232 of FIG. 2. Note that FIG. 3 exemplifies various configurations to be applied to industrial control systems.

Industrial control systems 240a and 240b exemplify a case where they are applied to existing interconnected industrial control systems. The industrial control systems 240a and 240b exchange data and control for management via the virtual network. For example, in an electricity distribution system, electric power generation, an amount of power consumption, and the like are mutually exchanged between adjacent generation control systems so that they mutually accommodate their surplus power. At this point, data related to the electric power generation and the amount of power consumption and control for accommodation requests of surplus power are exchanged mutually. The interconnected industrial control systems 240a and 240b respectively include intercommunication sections 260a and 260b for performing the exchange of control and data. On the other hand, security gateways 242a and 242b which are provided outside thereof respectively include monitoring sections 250a and 250b for monitoring traffic exchanged between the intercommunication sections 260a and 260b and for examining the validity of data and control which are exchanged. Note that the intercommunication sections 260a and 260b indicate functional parts as which functions of the existing industrial control systems 240a and 240b to mutually exchange control and data are abstracted.

The inspection performed by the monitoring sections 250a and 250b is not limited in particular, but may be a general security inspection in which an abnormality is suspected when login requests under the same user name from a counter industrial control system 240 fail repeatedly. Alternatively, in the case of the above electricity distribution system, the inspection may be the following inspections peculiar to the industrial control system: an inspection in which an abnormality is suspected when an accommodation request of electricity which may cause overload to an own industrial control system 240 is performed; and an inspection in which an abnormality is suspected when unexpected electric power generation and amount of power consumption are notified of.

The monitoring sections 250a and 250b monitor traffic usually performed between the existing industrial control systems 240a and 240b. When predetermined conditions under which an abnormality should be suspected are satisfied as a result of the inspection of information, the monitoring sections 250a and 250b suspect an abnormality of a counter industrial control system 240, and transmit an abnormality notification. The abnormality notification is transmitted to at least the sandbox management section 210, and if necessary, the abnormality notification is also transmitted to the security gateways of neighboring industrial control systems except the industrial control system suspected to have an abnormality. Note that the abnormality notification includes information (an industrial control system ID and the like) to specify the industrial control system 240 suspected to have an abnormality. Further, in another embodiment, the abnormality notification may include a value indicative of content of a suspected abnormality, e.g., a value indicative of a suspicious level or a value indicative of a type of abnormality, and the predetermined conditions under which an abnormality should be suspected may include conditions for determining these values. Note that the conditions under which an abnormality should be suspected, which conditions are used in the inspection, may be set by an administrator, individually, or may be managed collectively in the sandbox management section 210 and set to be distributed to the security gateways 242 from the sandbox management section 210.

An industrial control system 240c showing another configuration exemplifies a case where it is applied to an existing industrial control system which is designed in disregard of interconnection. The industrial control system 240c itself does not exchange control and data with its outside and therefore does not generate traffic between the industrial control system 240c and other industrial control systems. In view of this, in the present embodiment, a security gateway 242c provided outside the industrial control system 240c includes an intercommunication section 254c, so that the intercommunication section 254c generates traffic for performing a restrictive inspection on other industrial control systems. Similarly to the monitoring sections 250a and 250b, the monitoring section 250c monitors traffic exchanged between the intercommunication section 254c and an intercommunication section of another industrial control system, and examines the validity of exchanged data.

The intercommunication section 254c included in the security gateway 242c is not limited in particular, but it can generate traffic by monitoring input and output, by its corresponding industrial control system 240c, to a virtual sensor 246, a virtual actuator 248, and the like and taking up sensor data and control values to transmit them to its counterpart. The inspection by the monitoring section 250c is also not limited in particular, but the aforementioned general security inspection may be performed, or such an inspection may be performed that an abnormality is suspected when sensor data and control values transmitted from a counterpart have values out of an acceptable range (e.g., at the time when electric power generation has a negative value). Alternatively, when the monitoring section 250c is designed in disregard of interconnection, login and accommodation requests of electricity from the outside are not assumed, and therefore an inspection to detect such an unexpected external communication as an abnormality can be performed.

The aforementioned industrial control systems 240a to 240c all indicate configurations to implement an abnormality detection mechanism in the existing industrial control system 240 by providing a security gateway 242 between the industrial control system 240 and the virtual network adapter 244. In contrast, an industrial control system 240d showing another configuration exemplifies an industrial control system which is newly designed by taking a function of the aforementioned security gateway 242. The industrial control system 240d includes an intercommunication section 260d for generating traffic for inspection and a monitoring section 262d for monitoring the traffic, and does not need any security gateway as an external module. The intercommunication section 260d and the monitoring section 262d have functions respectively similar to the intercommunication section 254c and the monitoring section 250c.

In the configurations of the industrial control systems 240a and 240b in which intercommunication is performed, an abnormality is judged by monitoring traffic that is generally performed. This does not increase a load by generating another traffic for monitoring the abnormality of the counterpart so as to cause a resource of the counterpart to be consumed largely, for example. Further, in the configuration of the industrial control system 240c which does not take intercommunication into consideration and in the configuration of the industrial control system 240d that is newly designed, the intercommunication sections 254c and 260d take up their own sensor data and control values at given timing and transmit them to their counterpart, or receive those. Thus, they do not increase any load, especially. In any of the configurations, detailed inspection enough for confirming the abnormality of a counter industrial control system is not performed. Rather, information generated in the industrial control system 240 is taken up, and an inspection to just find a suspected abnormality of the counterpart is just performed. Thus, even in comparison with a case where close mutual monitoring is performed, it may be said that a load to occur for abnormality detection is extremely small.

The sandbox management section 210 is constituted by an abnormality-notification receiving section 212, entire topology data 214, an abnormality judging section 216, and a sandbox activity control section 218. The abnormality-notification receiving section 212 receives abnormality notifications transmitted from respective monitoring sections 250a to 250c and 262d of a plurality of industrial control systems 240a to 240d, and records them in the entire topology data 214. The entire topology data 214 records therein relations of mutual monitoring between the industrial control systems, from which industrial control system issues an abnormality notification for a suspected abnormality, and which industrial control system is suspected to have the abnormality. For example, when the industrial control system 240a reports that the industrial control system 240b is suspected to have an abnormality, the abnormality-notification receiving section 212 records an abnormality notification issued by the industrial control system 240a about the industrial control system 240b suspected to have an abnormality.

The abnormality judging section 216 reads out the entire topology data 214 and adds up abnormality notifications transmitted from respective monitoring sections 250 and 262 of the plurality of industrial control systems 240. The abnormality judging section 216 then evaluates the reputation of a control system suspected to have an abnormality, and from a result of the evaluation, the abnormality judging section 216 judges whether the control system is acknowledged as abnormal or not according to the criteria. The reputation is a result of collective consideration of the abnormality notifications transmitted from two or more control systems which monitor the control system suspected to have an abnormality. In a simple manner, the reputation can be indicated by the number of abnormality notifications, a ratio of the number of abnormality notifications to the number of control systems which perform monitoring. Further, in an embodiment in which the abnormality notification includes a value indicative of content of a suspected abnormality, e.g., a value indicative of a suspicious level, a weighting sum total of the number of abnormality notifications may be calculated according to the value indicative of a suspicious level. Furthermore, in an embodiment in which the abnormality notification includes a value indicative of a type of a suspected abnormality, a sum total of the number of abnormality notifications may be calculated per type of abnormality, or a weighting sum total of the number of abnormality notifications can be calculated according to the type of abnormality. Moreover, in a preferable manner, when an IDS 104 is provided on the network 102 as illustrated in FIG. 1, evaluation with higher accuracy may be performed in considering an abnormality notification notified of from the IDS.

Further, the criteria to be used for judging whether any abnormality occurs from the result of the evaluation may be, for example, the number of abnormality notifications, a ratio of the number of abnormality notifications to the number of control systems which perform monitoring, or a threshold value to a weighting sum total of the number of abnormality notifications. The threshold value can be a given fixed value by setting or a variable which fluctuates depending on conditions. As an example for fluctuating the threshold value dynamically, a reference level may be fluctuated depending on the entire number or frequency of abnormality notifications, or a reference level may be fluctuated every specific time zone. Further, there may be a plurality of types of criteria. For example, when a sum total of the number of abnormality notifications is calculated per type of abnormality, a threshold value may be provided per type of abnormality and prescribed as a logical sum or a logical product using a condition per type of abnormality.

The sandbox activity control section 218 controls an active state of each sandbox (virtual machine) 232a-232d. When it is judged that an abnormal is suspected according to the evaluation criteria of the reputation, the sandbox activity control section 218 issues a command to a hypervisor 230 which operates an industrial control system 240 in which the abnormality is confirmed, so as to activate the sandbox 232. When the sand box 232 is activated, outbound traffic from at least the inside of the sandbox 232 to the outside is restricted. When there is a control from the internal industrial control system 240 to an external actual actuator 124 via a virtual actuator 248, the restriction on the outbound traffic can be performed by blocking the connection to this actual actuator 124. More preferably, the restriction on the outbound traffic is performed by changing a logical connection with the virtual actuator 248 to a logical connection with a dummy actuator that behaves as if it is controlled according to the control.

On the other hand, as for inbound traffic such as sensor data which flows from an external actual sensor 122 to the inside of the sandbox 232, the inbound traffic may be allowed to directly reach the industrial control system 240, preferably without any restriction. For example, when there is only a one-way data flow from the actual sensor 122 to the industrial control system 240, the connection to the actual sensor 122 can be maintained. Thus, the sensor data from the actual sensor 122 is passed through the sandbox 232, and the logical connection with the actual actuator 124 is changed to a logical connection with the dummy actuator. Accordingly, even if someone breaks in the industrial control system 240 via a network, this configuration can prevent that the intruder notices that the industrial control system is isolated.

In FIG. 3, peripheral topology data 252 and 264 provided per industrial control system 240 are shown. Pieces of peripheral topology data 252a to 252c and 264d are data which are preferably included in the security gateways 242a and 242c, and the industrial control system 240d, respectively, so that they grasp states in which abnormality notifications are performed for corresponding counter industrial control systems 240 to be monitored. Details of the peripheral topology data 252a to 252c and 264d will be described later.

FIG. 4 is a view describing a flow of an abnormality detection process in the abnormality detection mechanism according to the embodiment of the present invention. In the example shown in FIG. 4, initially, a security gateway of the industrial control system 240*b* of sandbox (virtual machine) 232*b* inspects traffic that regularly or irregularly flows between the industrial control system 240*b* and the industrial control system 240*c*, and judges whether any abnormality is suspected or not (1). When the industrial control system 240*c* of sandbox (virtual machine) 232*c* is suspected to have an abnormality, the security gateway of the industrial control system 240*b* performs abnormality notification to the sandbox management section 210 and a security gateway of the industrial control system 240*a* of sandbox (virtual machine) 232*a* which also monitors the industrial control system 240*c* (2).

At this point, the sandbox management section 210 receives only an abnormality notification from the industrial control system 240*b* among two industrial control systems 240*a* and 240*b* both monitoring the industrial control system 240*c*. Here, the sandbox management section 210 judges that the criterion, "an abnormality is acknowledged when abnormality notification is performed by a majority of industrial control systems which perform monitoring," is not met, and the sandbox management section 210 does not activate the sandbox 232*c* of the industrial control system 240*c*. In a particular embodiment, at this point, the security gateway of the industrial control system 240*a* which receive an abnormality notification from the industrial control system 240*b* may change a threshold value in the inspection so as to increase a caution level.

Subsequently, regularly, irregularly, or at the timing of receiving the abnormality notification, the security gateway of the industrial control system 240*a* inspects traffic that flows between the industrial control system 240*a* and the industrial control system 240*c*, and judges whether the industrial control system 240*c* is suspected to have an abnormality (3). When the industrial control system 240*c* is suspected to have an abnormality, the security gateway of the industrial control system 240*a* performs abnormality notification to the sandbox management section 210 (4). At this point, in an embodiment in which a security gateway can hold peripheral topology data and record therein that an abnormality notification has been received from the industrial control system 240*b*, it is possible to omit abnormality notification to the security gateway of the industrial control system 240*b* which monitors the industrial control system 240*c* and has already transmitted an abnormality notification. Further, even in an embodiment in which peripheral topology data is not held and the abnormality notification to the security gateway of the industrial control system 240*b* is not omitted, since the security gateway of the industrial control system 240*b* itself has already performed abnormality notification, it is not necessary to perform an inspection again in response to the abnormality notification from the industrial control system 240*a*.

At this point, the abnormality notification is performed by at least a majority of systems that monitor the industrial control system 240*c*, the sandbox management section 210 judges that the criterion, "an abnormality is acknowledged when abnormality notification is performed by a majority of industrial control systems which perform monitoring," is met. Thus, the sandbox management section 210 acknowledges the industrial control system 240*c* as abnormal, and issues a command to a hypervisor on a physical machine where the industrial control system 240*c* operates, so as to activate the sandbox 232*c* (5). This accordingly blocks at least outbound traffic to an external actual actuator, thereby isolating, from the outside, the industrial control system 240*c* in which an abnormality is acknowledged. Further, if necessary, the sandbox management section 210 connects to an inspection network the industrial control system 240*c* in which an abnormality is acknowledged, so as to perform a further detailed inspection and diagnosis such as virus check (6).

Figure 5A:
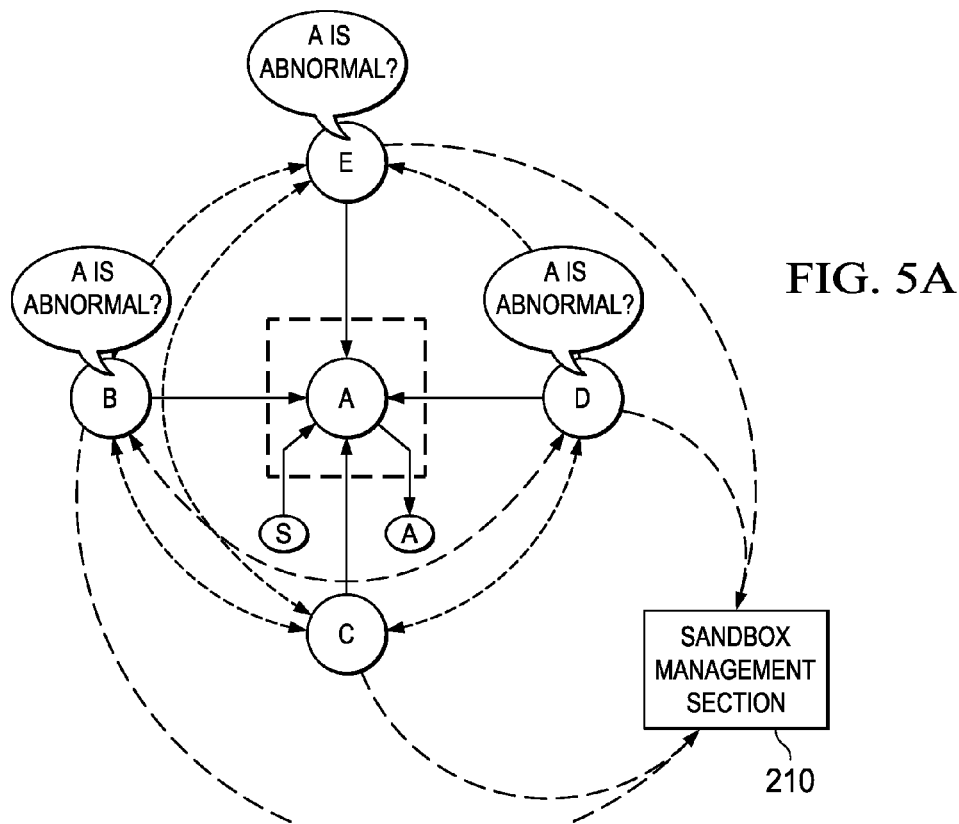
FIGS. 5A and 5B are views which describes the flow of the abnormality detection process according to the embodiment of the present invention in association with mutual monitoring topologies of industrial control systems.
Figure 5B:
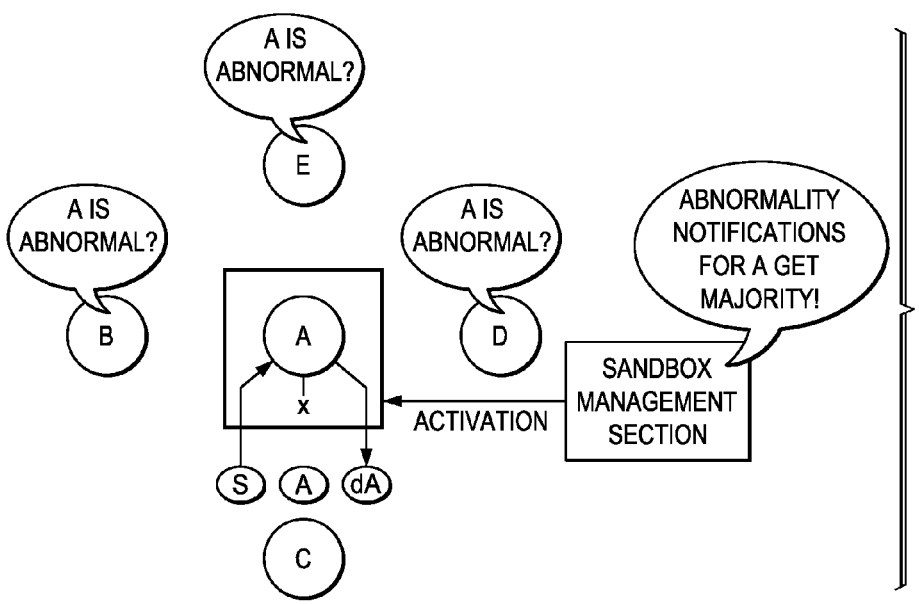

FIGS. 5A and 5B are views describing the flow of the abnormality detection process in the abnormality detection mechanism according to the embodiment of the present invention in association with mutual monitoring topologies of industrial control systems. FIG. 5A illustrates mutual monitoring topologies of the industrial control systems 240 and shows a state in which an industrial control system A is monitored by four industrial control systems B to E. For convenience, the four industrial control systems B to E which monitor the industrial control system A are referred to as "peripheral systems" of the industrial control system A, and the industrial control system A monitored by the peripheral systems B to E is referred to as a "target system." The peripheral systems B to E exchange abnormality notifications on the target system A with each other. In FIG. 5A, three industrial control systems B, D, and E among the peripheral systems B to E transmit respective abnormality notifications on the target system A.

At this point, when it is set as a criterion that an abnormality is acknowledged if the number of abnormality notifications gets a majority (a ratio is over 50%) of the number of peripheral systems, the sandbox management section 210 detects that the abnormality notifications on the industrial control system A gets a majority, and activates a sandbox 232 of the industrial control system A, as illustrated in FIG. 5B. As mentioned earlier, in the embodiment of the present invention, the sandbox management section 210 adds up abnormality notifications from the industrial control systems 240 and evaluates the reputation of an industrial control system suspected to have an abnormality, according to the mutual monitoring topologies of the industrial control systems 240, so as to acknowledged an abnormality to be dealt with.

Figure 6A:
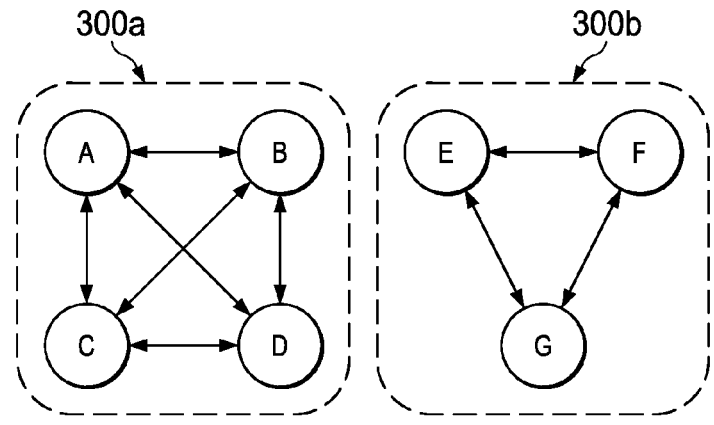
FIGS. 6A and 6B are views which exemplifies the mutual monitoring topologies.
Figure 6B:
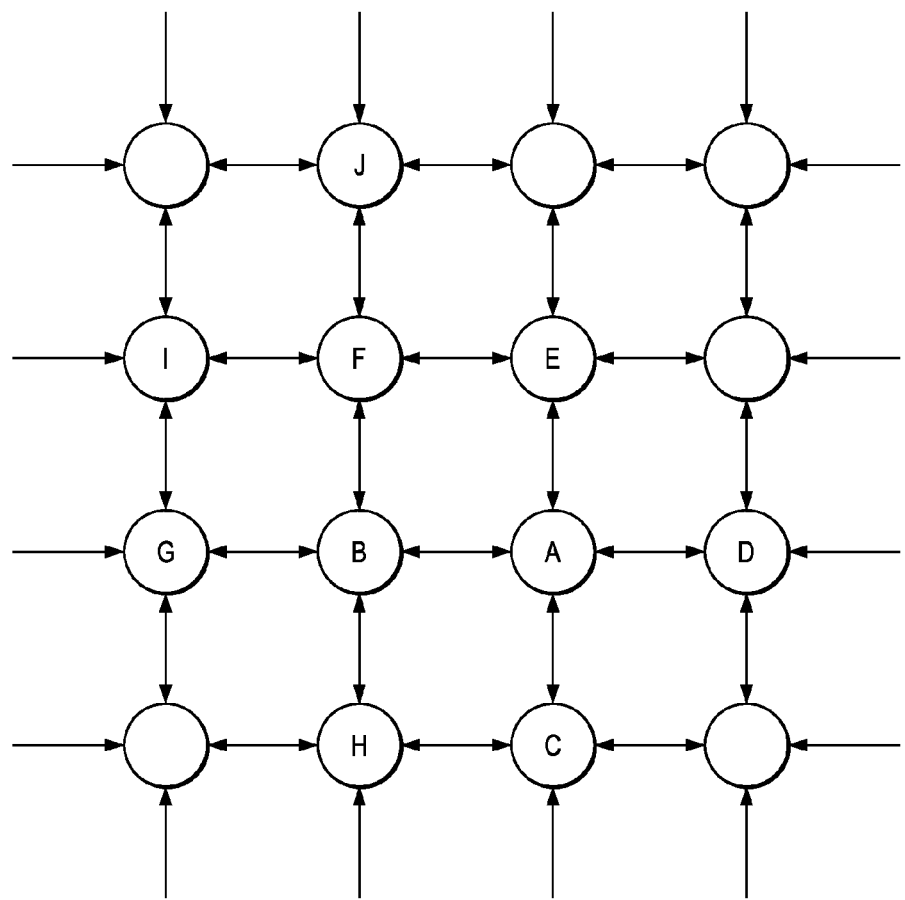

The mutual monitoring topologies of the industrial control systems 240 are not limited in particular. However, for example, as illustrated in FIG. 6A, while power generation management systems A to D which intercommunicate with each other are grouped (as a group 300*a*) so that they are mutually monitored by each other, utility management systems E to G which intercommunicate with each other are also grouped (as a group 300*b*) in the same manner so that they are mutually monitored by each other. Thus, a group can be defined individually per functional group which intercommunicates with each other. Further, in another example, as illustrated in FIG. 6B, a mutual monitoring topology can be defined by defining a given arrangement of industrial control systems and setting intercommunication sections 254 of respective security gateways 242 to perform mutual monitoring between adjacent systems in the arrangement.

FIGS. 7A and 7B exemplify a data structure of topology data maintained in the industrial control system according to the embodiment of the present invention. FIG. 7A shows entire topology data 214 managed by the sandbox management section 210. The entire topology data 214 manages a relation with at least one peripheral system per target system, and records an abnormality notification state (whether there are any abnormality notifications; when values indicative of a suspicious level and a type of abnormality are assigned, the values are also included in the state) on a target system by each peripheral system. The entire topology data 214 illustrated in FIG. 7A corresponds to the topology illustrated in FIG. 6B. In this example, for the industrial control system A as the target system, respective abnormality notification states by four peripheral systems, i.e., the industrial control systems B to E, are recorded, and for the industrial control system B as the target system, respective abnormality notification states by four peripheral systems, i.e., the industrial control system A, and F to H, are recorded. In FIG. 7A, further, for the industrial control system A, it is recorded that the abnormality notification is performed by the peripheral systems B, D, and E.

Note that as in the embodiment thus described, when one sandbox management section 210 is provided within the industrial system 100, it is possible to adopt entire topology data 214 which manages each industrial control system 240 in the industrial system 100 as a target system. However, the topology management method is not limited to this in particular. In another embodiment, it is possible to provide a plurality of sandbox management sections 210 which divide a management range of industrial control systems 240 managed in the industrial system 100, and in this embodiment, topology data can be provided for each assigned management range in each of the sandbox management sections.

FIG. 7B exemplifies pieces of data managed by the industrial control system B among pieces of peripheral topology data 252 and 264 managed per industrial control system 240. In the industrial control system B, pieces of peripheral topology data are assigned to respective industrial control systems. For each industrial control system (hereinafter, referred to as a target system to be monitored) monitored by the industrial control system B provided with the pieces of peripheral topology data, corresponding peripheral topology data records therein an abnormality notification state on the target system to be monitored, which state is obtained from at least one corresponding peripheral system other than the industrial control system B.

The peripheral topology data shown in FIG. 7B corresponds to the topology shown in FIG. 6B and shows peripheral topology data of the industrial control system B. Respective pieces of peripheral topology data shown in FIG. 7B are for the industrial control systems A, F, G, and H, which are taken as the target systems to be monitored, and each peripheral topology data records therein whether there is any abnormality detection by the industrial control system B itself and abnormality notification states on a corresponding target system to be monitored, which states are obtained from other peripheral systems except the industrial control system B. For example, for the target system A to be monitored, abnormality notification states from three peripheral systems (shown as "Peripheral Systems for A" in FIG. 7B; peripheral systems for the target systems F, G, and H to be monitored are also shown in the same manner), i.e., the industrial control systems C to E, are recorded. In the peripheral topology data shown in FIG. 7B, it is recorded that the industrial control system B itself detects an abnormality about the industrial control system A and further receives abnormality notifications from two peripheral systems, i.e., the industrial control systems D and E. By referring to the peripheral topology data shown in FIG. 7B, the security gateway of the industrial control system B can determine that, when it detects an abnormality of the industrial control system A, notification to the two peripheral systems, i.e., the industrial control systems D and E, is omittable.

Figure 8:
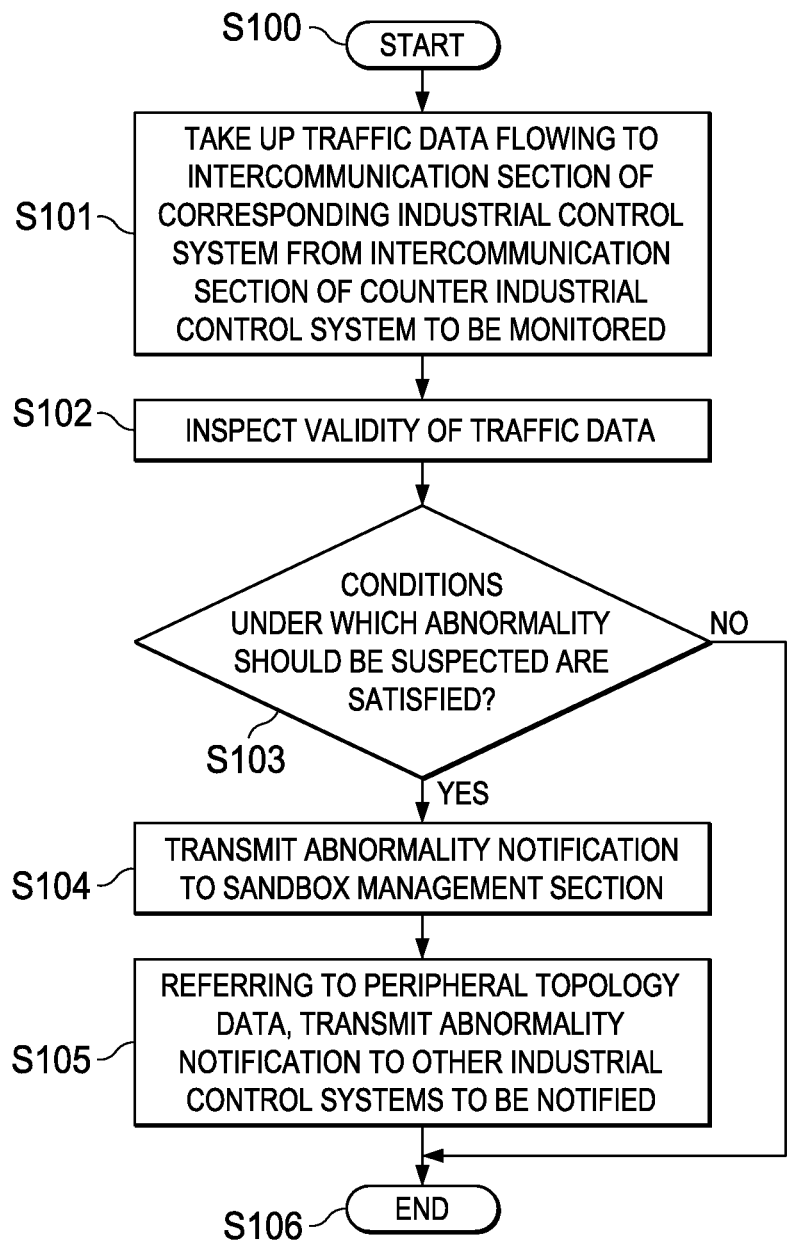
FIG. 8 is a flowchart illustrating an abnormality notification process executed by a monitoring section according to the embodiment of the present invention.

Hereinafter, with reference to FIG. 8 and FIG. 9, an abnormality detection process performed in the industrial system according to the embodiment of the present invention is described in detail. FIG. 8 is a flowchart illustrating an abnormality notification process executed by a monitoring section which is provided per industrial control system according to the embodiment of the present invention. The process shown in FIG. 8 starts from Step S100, regularly, irregularly, or in response to receipt of an abnormality notification from another industrial control system. Note that the process shown in FIG. 8 is executed per counter industrial control system to be monitored.

In Step S101, the monitoring section takes up traffic data which flows to an intercommunication section of its corresponding industrial control system from an intercommunication section (corresponding to reference numerals 260a and 260b in the industrial control systems 240a and 240b illustrated in FIG. 3, corresponding to a reference numeral 254c in the industrial control system 240c, and corresponding to a reference numeral 260d in the industrial control system 240d) of a counter industrial control system to be monitored.

In Step S102, the monitoring section examines validity of the traffic data from the counter industrial control system to be monitored, according to given conditions under which an abnormality should be suspected. Herein, the aforementioned general security inspection and an inspection on whether sensor data and control values transmitted from the counterpart are within an acceptable range or not are performed. In Step S103, the monitoring section judges whether the conditions under which an abnormality should be suspected are satisfied or not, and when they are satisfied (YES), the monitoring section advances the process to Step S104.

In Step S104, the monitoring section suspects the abnormality of the counter industrial control system, and transmits an abnormality notification to the sandbox management section 210. In Step S105, the monitoring section refers to peripheral topology data to check abnormality notification states of other peripheral systems which assume the counter industrial control system as a target system to be monitored. If there is another industrial control system that has not performed the abnormality notification yet, the monitoring section transmits an abnormality notification to the another industrial control system, and terminates this process in Step S106. In an embodiment in which each security gateway 242 does not hold peripheral topology data, the monitoring section may broadcast the abnormality notification in Step S105, or perform the abnormality notification only to the sandbox management section 210 in Step S104 without providing Step S105. On the other hand, when it is judged that the conditions under which an abnormality should be suspected are not satisfied in Step S103 (NO), the monitoring section advances the process directly to Step S106 to terminate this process.

Figure 9:
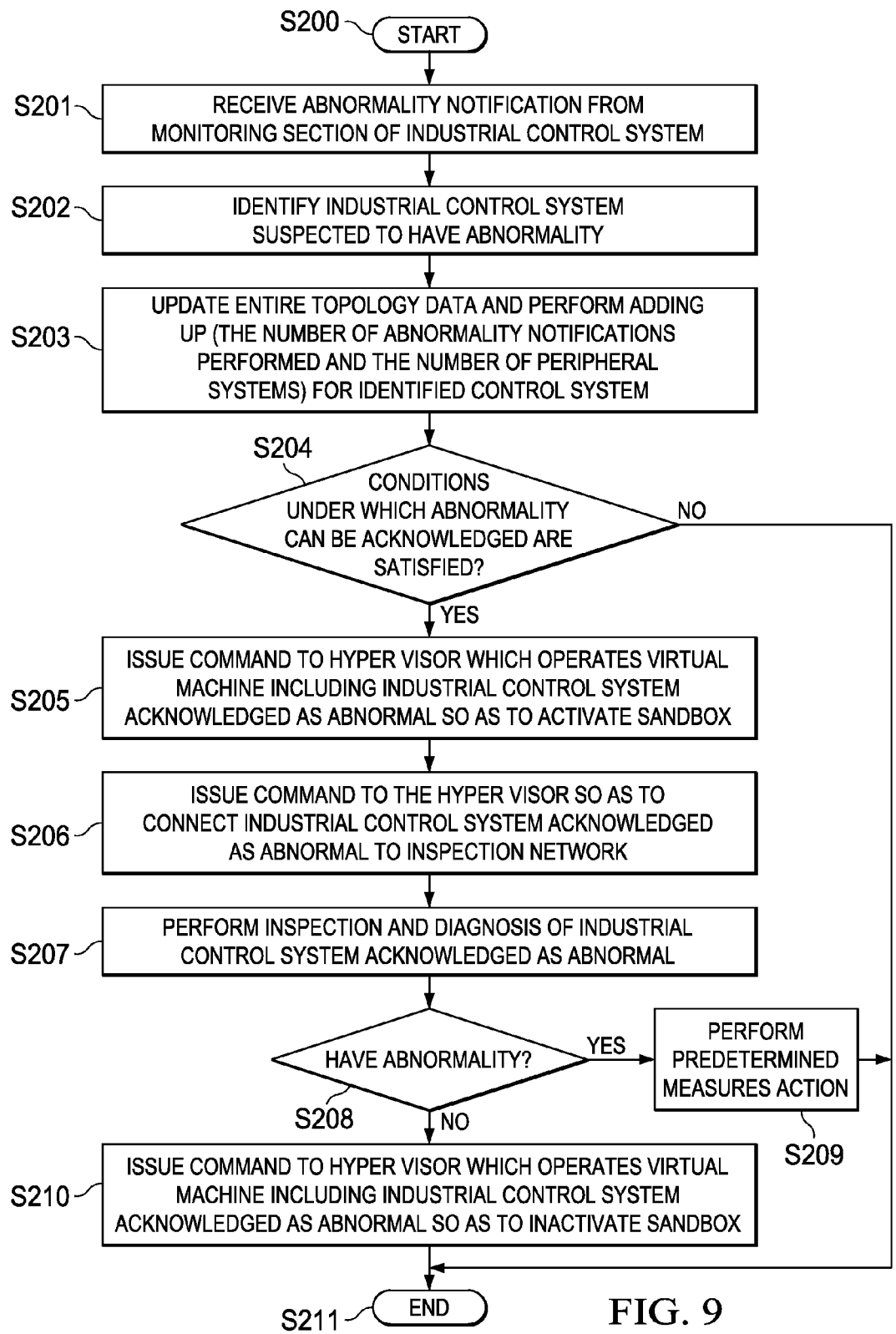
FIG. 9 is a flowchart illustrating an abnormality detection process executed by a sandbox management section according to the embodiment of the present invention.

FIG. 9 is a flowchart illustrating an abnormality detection process executed by the sandbox management section according to the embodiment of the present invention. The process shown in FIG. 9 starts from Step S200 in response to abnormality notification performed by a monitoring section which is provided in any of the industrial control systems. In Step S201, the sandbox management section 210 receives an abnormality notification from the monitoring section of any of the industrial control systems, and in Step S202, the sandbox management section 210 identifies, from an industrial control system ID attached to the abnormality notification, an industrial control system suspected to have an abnormality.

In Step S203, the sandbox management section 210 records an abnormality report for the industrial control system suspected to have an abnormality, which abnormality report is transmitted from the any of the industrial control systems, updates entire topology data 214, and adds up abnormality notifications for the identified industrial control system so as to evaluate the reputation thereof. Herein, the number of abnormality notifications performed for the industrial control system suspected to have an abnormality is counted. Further, in cases where a criterion of a ratio of the number of abnormality notifications to the number of peripheral systems and a criterion in which an abnormality is acknowledged when the abnormality notification is performed by all industrial control systems which perform monitoring are set as evaluation criteria of the reputation, the number of peripheral systems which monitor the industrial control system suspected to have an abnormality is also counted.

In Step S204, from an evaluation result of the reputation by the peripheral systems on the industrial control system suspected to have an abnormality, the sandbox management section 210 judges whether the conditions under which an abnormality should be acknowledged are satisfied or not according to the criteria. When the industrial control system is acknowledged as abnormal in Step S204 (YES), the process is advanced to Step S205. In Step S205, the sandbox management section 210 issues a command to a hypervisor 230 which operates a virtual machine including the industrial control system which is acknowledged as abnormal, so as to activate a sandbox.

Figure 10:
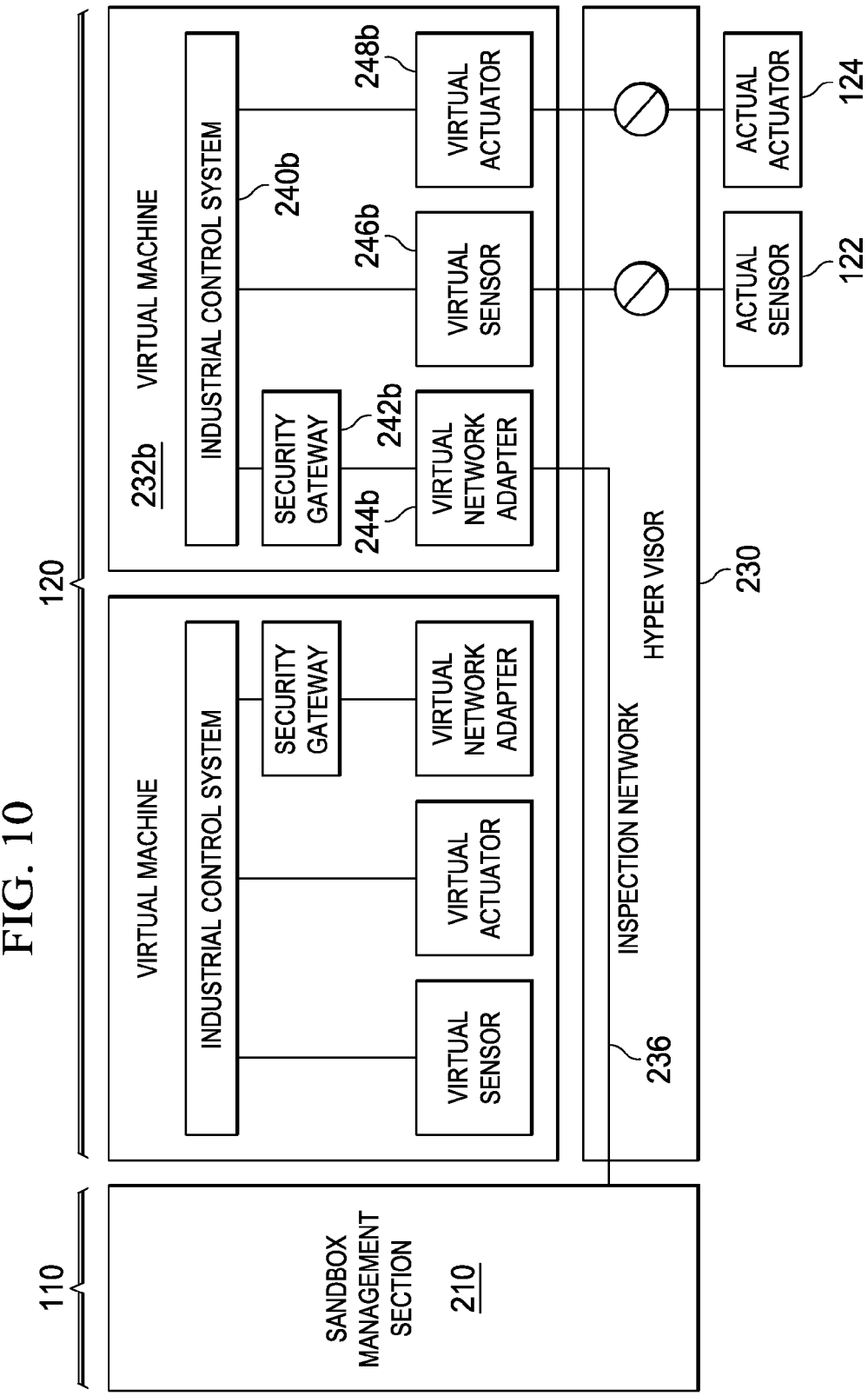
FIG. 10 is a view which describes a process of changing a logical connection of a virtual network adapter of a virtual machine to an inspection network 236.

In Step S206, the sandbox management section 210 further issues a command to the hypervisor, so as to connect to an inspection network 236 the industrial control system which is acknowledged as abnormal. The inspection network 236 is a network to which a diagnostic module capable of performing detailed inspection and diagnosis is connected, in which the industrial control system acknowledged as abnormal can participate, and which is isolated from general networks. FIG. 10 illustrates a state in which a logical connection of a virtual network adapter 244b of a virtual machine 232b in which the industrial control system acknowledged as abnormal is changed from a general virtual network 234 illustrated in FIG. 2 to the inspection network 236, and further, connections to the virtual sensor 246b and the virtual actuator 248b are blocked. Note that FIG. 10 exemplifies a case where the sandbox management section 210 includes the diagnostic module, but the diagnostic module may be implemented as an individual module on another computer system.

In Step S207, by using, via the inspection network 236, the diagnostic module provided in the management server 110, for example, detailed inspection and diagnosis of the industrial control system acknowledged as abnormal are performed. In Step S208, it is judged whether an abnormality is found or not as a result of the detailed inspection and diagnosis. When it is judged that an abnormality is found in Step S208 (YES), the process is advanced to Step S209. In Step S209, the sandbox management section 210 performs a predetermined measures action, and completes this process in Step S211.

As the measures action performed in Step S209, it is possible to perform the following actions: alert notification; continuation of the operation of an industrial control system suspected to have an abnormality in a sandbox-active state; further detailed inspection of the industrial control system suspected to have an abnormality; and restart from a default state or a state at the time of taking a snapshot, by use of a snapshot of a control system suspected to have an abnormality or by use of a backup. The continuation of the operation of an industrial control system in a sandbox-active state is useful for the purpose of looking into the source of malware. Further, on this occasion, in a preferable manner, the sandbox management section 210 may issue a command to the hypervisor 230 which operates the industrial control system acknowledged as abnormal, so that the progress of time in the virtual machine 232 acknowledged as abnormal can be delayed on purpose. Such time delay of the virtual machine 232 can be performed, for example, by use of a technique disclosed in Japanese Unexamined Patent Publication No. 2007-34672 (Patent Document 7). As a result, even if an abnormality occurs by any chance in the industrial control system acknowledged as abnormal, the behavior of the industrial control system can be observed while the progress of defects and adverse effects to the outside are kept as minimum.

On the other hand, when it is judged that there is no abnormality in Step S208 (NO), the process is advanced to Step S210. In Step S210, since no abnormality is found actually, the sandbox management section 210 issues a command to the hypervisor 230 which operates the virtual machine acknowledged as abnormal so as to inactivate the sandbox to restore the virtual machine to a normal state, thereby completing this process in Step S211. On the other hand, even when it is judged that the conditions under which an abnormality should be acknowledged are not satisfied according to the criteria in Step S204 (NO), this process is terminated in Step S211.

According to the above embodiment, an industrial control system suspected to have an abnormality within the system can be effectively detected by moderately monitoring intercommunication between industrial control systems 240, thereby eventually resulting in that a monitoring load for abnormality detection between the industrial control systems can be reduced. Further, in a normal state, a sandbox (that is, a protected area) is not restricted at all about traffic between an industrial control system operating inside the sandbox and the outside, and the sandbox is isolated at the stage where an abnormality is confirmed. Thus, when the sandbox is in an inactive state, the industrial control system can work in the environment which is the same as the normal state.

As described above, according to the embodiment of the present invention, it is possible to provide an abnormality detection system, an abnormality detection apparatus, an abnormality detection method, a program, and a storage medium each of which can isolate a control system in which an abnormality is confirmed, by moderately monitoring intercommunication between control systems and effectively detecting a control system suspected to have an abnormality.

The management server 110 including the sandbox management section 210 according to the embodiment of the present invention is provided as an abnormality detection apparatus by loading a computer-executable program in a computer apparatus to realize each functional part. Such a program can be realized by a computer-executable program described in a legacy programming language such as FORTRAN, COBOL, PL/I, C, C++, JAVA (registered trademark), JAVA (registered trademark) Beans, JAVA (registered trademark) Applet, JAVA (registered trademark) Script, Perl, or Ruby, or in an object-oriented programming language, and the program can be stored in a device-readable storage medium so as to be distributed.

The present invention has been described based on the embodiments and examples illustrated in the drawings. However, the present invention is not limited to any of the embodiments illustrated in the drawings, and can be performed in other embodiments or altered by addition, change, deletion or the like as far as a person skilled in the art can conceive. All the embodiments are included in the scope of the present invention as far as the operation and effect of the present invention are yielded.

DESCRIPTION OF THE REFERENCE NUMERALS

100 . . . industrial system,
102 . . . network,
104 . . . IDS,
110 . . . management server,
120 . . . physical machine, 122 ... sensor,
124 ... actuator,
200 ... functional block,
210 ... sandbox management section,
212 ... abnormality-notification receiving section,
214 ... entire topology data,
216 ... abnormality judging section,
218 ... sandbox activity control section,
230 ... hypervisor,
232 ... virtual machine,
234 ... virtual network,
236 ... inspection network,
240 ... industrial control system,
242 ... security gateway,
244 ... virtual network adapter,
246 ... virtual sensor,
248 ... virtual actuator,
250, 262 ... monitoring section,
252, 264 ... peripheral topology data,
254, 260 ... intercommunication section, and
300 ... group.

The invention claimed is:

1. An abnormality detection system for detecting an abnormality in a network, comprising:
a plurality of control systems each connected to the network and operating in a corresponding protected area;
a monitoring section provided in each control system of the plurality of control systems, the monitoring section being for inspecting data exchanged between the control system and a counter control system to be monitored and for transmitting an abnormality notification when the counter control system is suspected to have an abnormality; and
a management section for adding up abnormality notifications transmitted from respective monitoring sections of the plurality of control systems so as to evaluate the reputation of the counter control system suspected to have an abnormality, and for causing a protected area for operating the counter control system suspected to have an abnormality to restrict outbound traffic from a virtual actuator inside of the protected area to an actual actuator outside the protected area by a hypervisor blocking a connection from the virtual actuator to the actual actuator and to pass inbound traffic from an actual sensor outside the protected area to a virtual sensor inside of the protected area by the hypervisor maintaining a connection from the actual sensor to the virtual sensor, when an indication is identified that the counter control system is abnormal according to criteria from a result of the evaluation, wherein the management section causes the protected area for operating the counter control system suspected to have an abnormality to connect a dummy control device in the protected area, instead of an actual control device, to the counter control system operating in the protected area.

2. The abnormality detection system according to claim 1, wherein the management section further causes the protected area for operating the counter control system suspected to have an abnormality to separate the counter control system from the network and to connect the counter control system to an inspection network to which a diagnostic module is connected.

3. The abnormality detection system according to claim 2, wherein, when no abnormality is continued as a result of diagnosis by the diagnostic module, the management section causes the protected area for operating the counter control system suspected to have an abnormality to release the restriction on the outbound traffic, and causes the protected area to separate the counter control system from the inspection network so as to restore the connection to the network.

4. The abnormality detection system according to claim 3, wherein, when an abnormality is confirmed as a result of diagnosis by the diagnostic module, the management section performs at least one measures action selected from the group comprising of the following actions: alert notification; continuation of the operation of the counter control system suspected to have an abnormality in a restricted state; detailed inspection of the counter control system suspected to have an abnormality; or restart from a past state of the counter control system suspected to have an abnormality.

5. The abnormality detection system according to claim 1, wherein the monitoring section transmits the abnormality notification to the management section and the monitoring sections provided in plurality of control systems for monitoring the counter control system suspected to have an abnormality, the plurality of control systems excluding the counter control system suspected to have an abnormality.

6. The abnormality detection system according to claim 1, wherein the protected area is implemented as a system virtual machine including a control system to be operated therein as an application; and the monitoring section is implemented, as a security gateway provided outside the control system to be operated, on the same virtual machine for operating the control system to be operated, as well as an intercommunication section for generating traffic for performing a restrictive test for the other control systems.

7. An abnormality detection apparatus for detecting an abnormality in a network in which a plurality of control systems operate in respective protected areas, the abnormality detection apparatus comprising:
a receiving section for receiving, from one or more control systems in the plurality of control systems, respective abnormality notifications for respective counter control systems to be monitored by the plurality of control systems;
a judging section for adding up abnormality notifications so as to evaluate the reputation of the counter control system suspected to have an abnormality, the reputation being made by at least two control systems in the plurality of control systems for monitoring the counter control system, and for judging whether the counter control system suspected to have an abnormality is abnormal or not according to criteria; and
a control section for causing a protected area for operating the counter control system suspected to have an abnormality to restrict outbound traffic from a virtual actuator inside the protected area to an actual actuator outside the protected area by a hypervisor blocking a connection from the virtual actuator to the actual actuator and to pass inbound traffic from an actual sensor outside the protected area to a virtual sensor inside of the protected area by the hypervisor maintaining a connection from the actual sensor to the virtual sensor, when an indication is identified that the counter control system is abnormal according to the criteria from a result of the evaluation, wherein the control section causes the protected area for operating the counter control system suspected to have an abnormality to connect a dummy control device in the protected area, instead of an actual control device, to the counter control system operating in the protected area.

8. The abnormality detection apparatus according to claim 7, wherein the control section further causes the protected area for operating the counter control system suspected to have an abnormality to separate the counter control system from the network and to connect the counter control system to an inspection network to which a diagnostic module is connected.

9. The abnormality detection apparatus according to claim 8, wherein, when no abnormality is confirmed as a result of diagnosis by the diagnostic module, the control section causes the protected area for operating the counter control system suspected to have an abnormality to release the restriction on the traffic, and causes the protected area to separate the counter control system from the inspection network so as to restore the connection to the network.

10. The abnormality detection apparatus according to claim 7, wherein the judging section transmits the abnormality notification to the control section and the judging sections provided in plurality of control systems for judging whether the counter control system suspected to have an abnormality, the plurality of control systems excluding the counter control system suspected to have an abnormality.

11. The abnormality detection apparatus according to claim 9, wherein, when an abnormality is confirmed as a result of diagnosis by the diagnostic module, the control section performs at least one measures action selected from the group comprising of the following actions: alert notification; continuation of the operation of the counter control system suspected to have an abnormality in a restricted state; detailed inspection of the counter control system suspected to have an abnormality; or restart from a past state of the counter control system suspected to have an abnormality.

12. The abnormality detection apparatus according to claim 7, wherein the protected area is implemented as a system virtual machine including a control system to be operated therein as an application; and the judging section is implemented, as a security gateway provided outside the control system to be operated, on the same virtual machine for operating the control system to be operated, as well as an intercommunication section for generating traffic for performing a restrictive test for the other control systems.

13. A non-transitory storage medium storing a computer-executable program therein, wherein the computer-executable program, when executed on a computing device, causes the computing device to:
receive, from one or more control systems in a plurality of control systems, an abnormality notification for a counter control system to be monitored by the plurality of control systems;
add up abnormality notifications so as to evaluate the reputation of the counter control system suspected to have an abnormality, the reputation being made by at least two control systems in the plurality of control systems for monitoring the counter control system, and judging whether the counter control system suspected to have an abnormality is abnormal or not according to criteria;
cause a protected area for operating the counter control system suspected to have an abnormality to restrict outbound traffic from a virtual actuator inside of the protected area to an actual actuator outside the protected area by a hypervisor blocking a connection from the virtual actuator to the actual actuator and to pass inbound traffic from an actual sensor outside the protected area to a virtual sensor inside of the protected area by the hypervisor maintaining a connection from the actual sensor to the virtual sensor, when an indication is identified that the counter control system is abnormal according to the criteria from a result of the evaluation; and
cause the protected area for operating the counter control system suspected to have an abnormality to connect as dummy control device in the protected area, instead of an actual control device, to the counter control system operating in the protected area.

14. The non-transitory storage medium according to claim 13, wherein the computer-executable program further causes the computing device to:
cause the protected area for operating the counter control system suspected to have an abnormality to separate the counter control system from the network and to connect the counter control system to an inspection network to which a diagnostic module is connected.

15. The non-transitory storage medium according to claim 14, wherein the computer-executable program further causes the computing device to:
when no abnormality is confirmed as a result of diagnosis by the diagnostic module, cause the protected area for operating the counter control system suspected to have an abnormality to release the restriction on the outbound traffic, and causing the protected area to separate the counter control system from the inspection network so as to restore the connection to the network.

16. The non-transitory storage medium according to claim 13, wherein the computer-executable program further causes the computing device to:
transmit the abnormality notification to the plurality of control systems for monitoring the counter control system suspected to have an abnormality, the plurality of control systems excluding the counter control system suspected to have an abnormality.

17. The non-transitory storage medium according to claim 15, wherein, when an abnormality is confirmed as a result of diagnosis by the diagnostic module, the computer-executable program further causes the computing device to perform at least one measures action selected from the group comprising of the following actions: alert notification; continuation of the operation of the counter control system suspected to have an abnormality in a restricted state; detailed inspection of the counter control system suspected to have an abnormality; or restart from a past state of the counter control system suspected to have an abnormality.

* * * * *